Aug. 28, 1923.
B. F. FITCH
FREIGHT HANDLING SYSTEM
Filed July 7, 1921
1,466,296
2 Sheets-Sheet 1
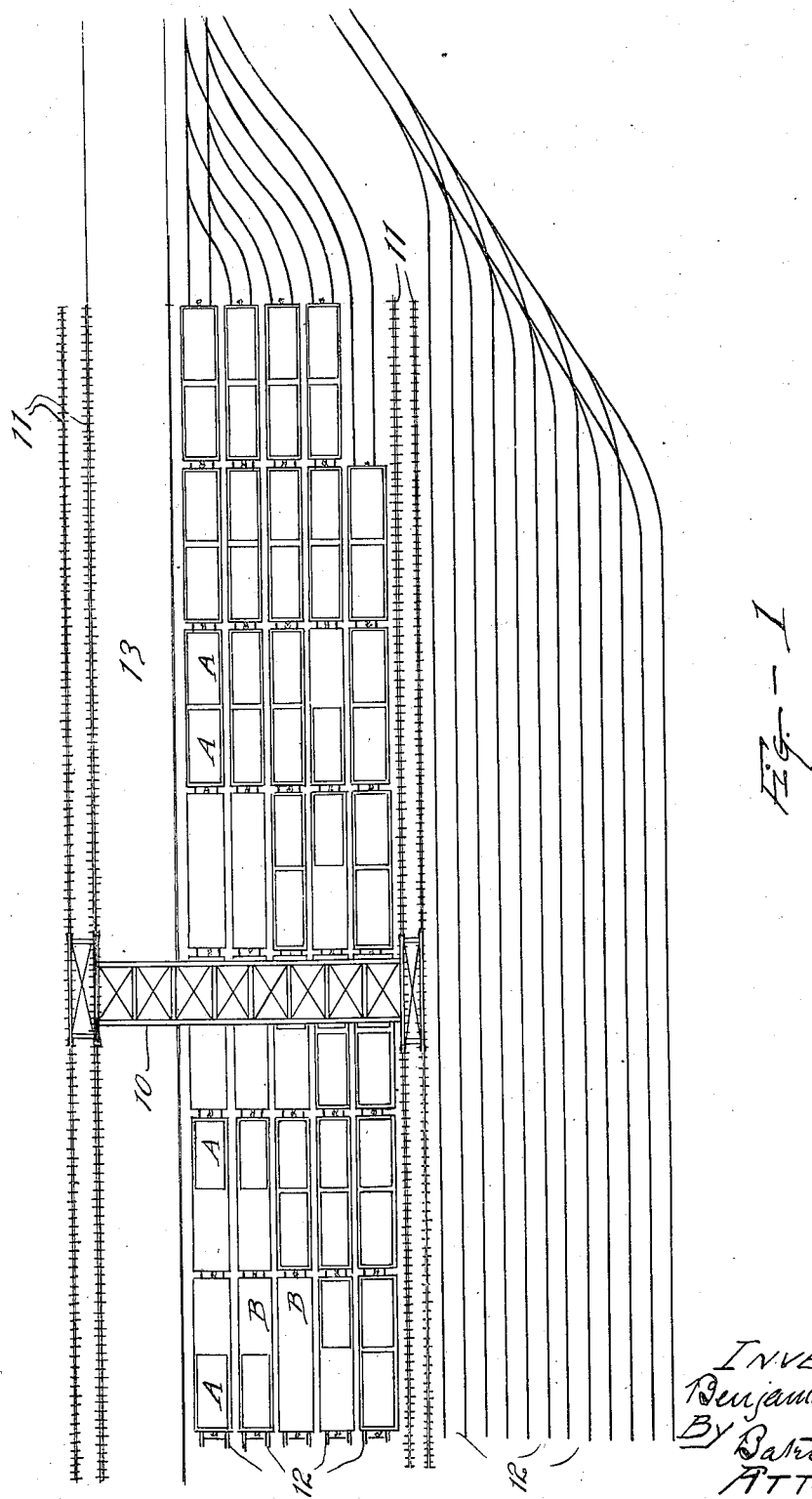

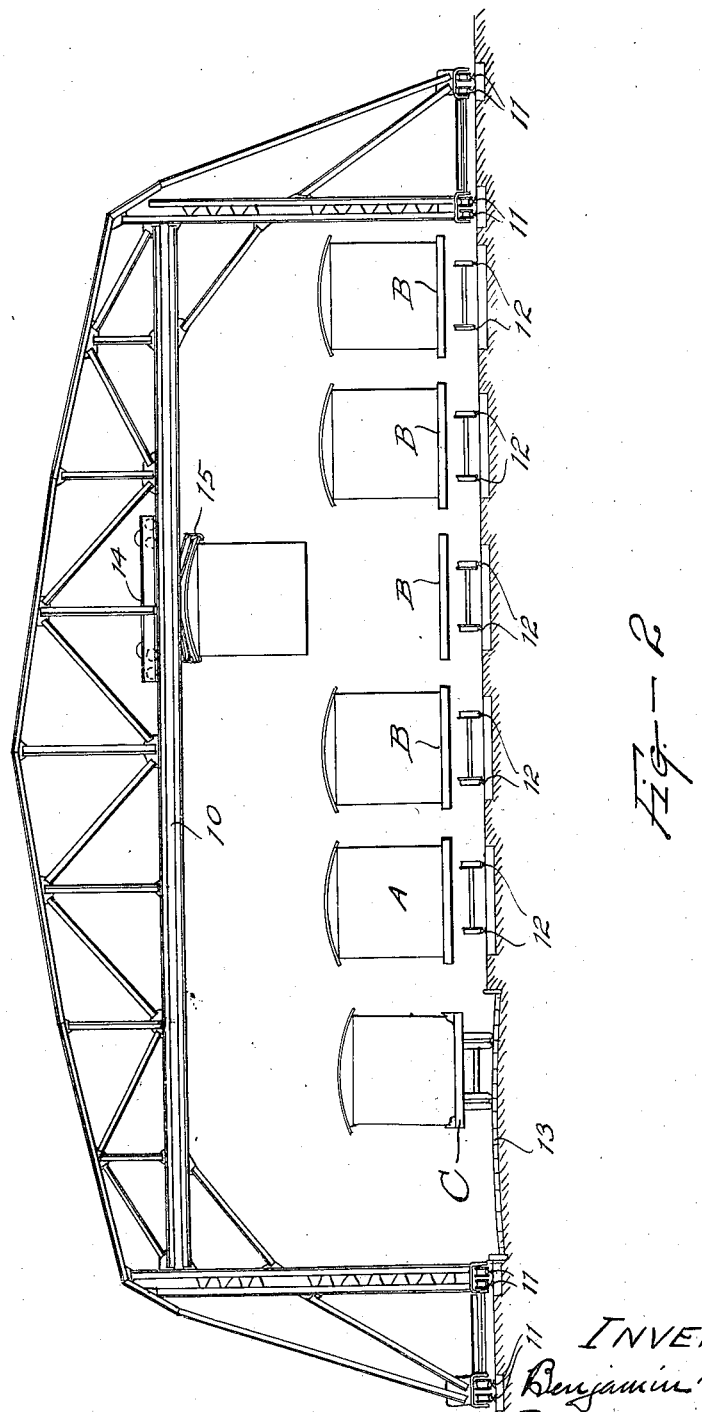

Patented Aug. 28, 1923.

1,466,296

UNITED STATES PATENT OFFICE.

BENJAMIN F. FITCH, OF EVANSTON, ILLINOIS.

FREIGHT-HANDLING SYSTEM.

Application filed July 7, 1921. Serial No. 482,925.

*To all whom it may concern:*

Be it known that I, BENJAMIN F. FITCH, a citizen of the United States, residing at Evanston, in the county of Cook and State of Illinois, have invented a certain new and useful Improvement in Freight-Handling Systems, of which the following is a full, clear, and exact description, reference being had to the accompanying drawings.

This invention relates to freight handling systems and is primarily concerned with the provision of a method for classifying freight for direct line movement or for distribution in sub-station or industrial transfer. My invention is concerned with a transfer system for freight wherein removable automobile bodies are employed, which may be deposited on freight cars.

In classifying freight in accordance with the usual system at present in vogue, it is necessary to employ a large number of men for directing the various cars to the designated track in a "hump" classification yard. Furthermore it is frequently necessary, in order to secure the proper collocation of the cars for line movement and for industrial switching, to employ switch engines for classifying the cars in accordance with the destination to which the cars are consigned. In practice the cars to be classified are usually taken to a "hump" which is located at a point where the various classification tracks converge, and from this point the cars are sent by gravity one or more at a time down an incline, and switched to individual tracks in accordance with the destination of the freight. In making up trains, it is frequently necessary to run the cars over the hump several times before the cars are placed in the desired collocation for line movement. All of this successive handling necessitates not only a great expenditure of time, but also considerable investment in rolling equipment, and trackage, for accomplishing the desired results.

In handling freight according to my method, I have found that considerable time may be saved in handling package freight by transporting a unit package or mass in the form of an automobile body, from a truck directly to a flat car for inter-city transportation. To facilitate the handling of package freight in bulk and simultaneously to decrease the time required for classifying freight for line movement, I have found that by providing an aerial transportation mechanism adjacent a classification yard, the disposition of both incoming and outgoing freight may be greatly facilitated, and the necessity for switch engines may be almost entirely dispensed with at the classification point.

An object of my invention is therefore to provide a classification system, wherein trains, made up of cars having containers thereon consigned to various destinations, may be brought onto a siding adjacent a number of flat cars, which may be designated for intra-city, sub-station, or industrial transfer, respectively, and to transfer the containers from the incoming train by an overhead system, to any designated train, and to any designated car in such train. In this connection, my invention contemplates the provision of a truck runway, adjacent the inbound track, so that the containers may be disposed on waiting automobile trucks for transfer, either to store-door delivery, or to other transfer stations.

In accomplishing the above objects, I prefer to provide a truck runway adjacent a set of railroad tracks in connection with a present "hump" classification yard, and I provide a track-straddling crane which extends over a series of parallel tracks and over the truck runway. This crane is provided with suitable hoisting mechanism for engaging the removable automobile body, raising it and transporting it overhead, either from an automobile truck to a railroad car, or vice versa.

My invention, including the method of transferring freight above referred to, is hereinafter more fully described in connection with the classification yard, shown in the drawings. My invention offers opportunity for application in various ways, as may be necessary to comply with the trackage equipment, and with the location of the sidings to the main line. The essential features and characteristics of my invention are summarized in the claims.

Fig. 1 is a diagram illustrating my system of overhead freight classification as employed in connection with existing freight classification yards; Fig. 2 is a side elevation of the track-straddling crane showing the railroad cars and truck in end elevation.

I have shown a track-straddling crane, designated generally at 10, as supported on tracks 11, which extend lengthwise and outside of a series of parallel tracks 12. In the embodiment shown, the tracks 12 form a portion of a classification yard.

In Fig. 2, I have shown a truck runway 13 as extending along side the trackways 12 and beneath the overhead crane 10. This truck runway preferably extends the entire length of the tracks 12, and is wide enough to permit two or more trucks to move abreast of each other. A suitable hoisting mechanism may be carried by the supplemental frame 14 for raising the container from the truck or from a railroad car, and transporting it overhead transversely of the trackway.

Assuming that an incoming train composed of loaded cars, which are picked up along the division, are brought into the classification yard, and assuming that this train comprises car loads and less than car loads of freight, then this train is drawn onto the track adjacent the truck runway. Prior to the arrival of the incoming train, it is desirable to have a number of empty cars arranged on the tracks adjacent the incoming line and beneath the crane for receiving the containers. These empty cars may be arranged for distribution to sub-stations, to industrial and to inter-city points, respectively.

In distributing the containers from the incoming trains the crane 10 moves on the trackway and the supplemental frame moves transversely thereof, until a load engaging cradle 15 is positioned over one of the bodies or containers, designated A. The cradle then engages the container, raises it and transports it either on the awaiting cars, designated B, or to an empty truck, indicated at C. In arranging the bodies on the empty cars, it is possible to place the body on the proper cars for making up a train in a single operation. If, however, one body is misplaced, then instead of uncoupling the cars to correct the misplacement, it is only necessary to move the crane to the desired location and interchange the bodies, in accordance with the proper destination thereof.

In distributing by trucks, it is desirable to have a number of empty trucks available at the time the train is ready for moving containers from the incoming trains. These trucks may move longitudinally of the tracks with the crane so that it is only necessary for the supplemental frame 14 to move laterally a short distance for transporting a body from the car to an automobile truck. As soon as the truck has received the body, it can pull away and another be driven immediately beneath the crane which in the meantime, has moved over another body on the car. The departing truck may then be dispatched either for store door delivery, or for any point to which the container may be consigned.

If the incoming trains are made up of car load freight, together with cars having containers thereon, then considerable time may be saved by immediately removing the containers from the trains and depositing them either on awaiting trucks or alongside the track for future classification. In this way, the car load freight will not be detained during the time required for raising and transporting the containers to empty cars for making up other trains. As soon as the containers are removed, then the incoming trains may be taken to the "hump" and the carload freight classified and the crane may be employed for making up the trains on the empty cars B.

The above method of classification has been concerned with the distribution of freight which has been brought into the yard from points along the division. My system, however, is well adapted for use in connection with freight which originates within the city and is consigned for inter-city movement. The method of handling such freight will now be described.

Assuming that a number of automobile trucks having loaded bodies arrive at the truck runway 13, and assuming that there are a number of empty cars B arranged for inter-city destination standing on the track 12. Now if the trucks arrive at the yard within a short period of time then each container may be removed and deposited alongside the trackway to prevent the truck from standing idle beneath the crane. Then when the trucks have departed the crane may be employed for transporting the bodies on the desired train and in the proper rotation upon such train in accordance with the incoming containers. If the trucks arrive at intervals sufficient for enabling the crane to be moved, then the crane may be immediately employed for positioning the container on the car in accordance with the destination to which the container is consigned. In this way, the trains may be made up for line movement with only one operation and the necessity of successive classification is thereby dispensed with.

To classify freight according to my system, it is not necessary that the classification yard be located adjacent the present freight terminals, the only requirements being that access may be had to the yard by automobile trucks. Accordingly, the yard may be placed in the suburbs of a city where realty is materially less in cost than adjacent the present terminals, and the railroads may expand without necessitating the purchase of expensive realty for additional trackage, or right of way for the trucks.

From the foregoing description, it will be seen that I have provided a system of railroad transportation for less-than-carload-freight, which system eliminates the necessity for successive re-classification in classification yards, and enables the trains to be made up for direct line movement in a single operation. Furthermore, it will be seen that I have provided a system which is adapted for use in connection with incoming or outgoing freight in eliminating the necessity of industrial switching, junction switching and inter-city switching. An advantage of this method is that considerable time is saved in handling freight within a terminal, and that such handling may be accomplished at points outside the terminal where realty is materially cheaper and sufficient space is provided for the necessary expansion as congestion demands it.

Having thus described my invention, I claim:

1. A method of classifying freight comprising arranging a number of empty cars coupled together in rows, placing freight in a unit package or mass, raising each package and transporting it overhead and then depositing it on any selected car, whereby a train may be made up for immediate transportation without reclassifying the cars.

2. A method of classifying freight comprising positioning of a train having unit packages of unclassified freight adjacent to a set of coupled unloaded cars, raising and transporting each package overhead individually from said train to any selected car, whereby the cars onto which the various packages are transferred are immediately collocated for line movement.

3. A method of freight classification comprising the storing of freight in containers adapted for mounting on cars, bringing such containers adjacent a set of coupled railroad cars adapted to receive the containers, transporting each container overhead onto any selected car, whereby a train may be made up for line movement as soon as the packages are deposited on the cars.

4. In combination, a plurality of railroad tracks, a truck runway extending parallel to said tracks, automobile trucks having removable bodies wherein package freight may be stored, and means straddling said tracks and runway for raising a body from the truck, transporting it overhead, and then depositing it on a selected car of a coupled train of cars, whereby the cars are in condition for immediate transportation.

5. The combination of a plurality of parallel railroad tracks, a truck runway extending parallel therewith, a traveling crane overhanging the runway and tracks, automobile trucks on the runway having removable bodies, and coupled trains of cars formed to receive the bodies and located on said tracks.

In testimony whereof, I hereunto affix my signature.

BENJAMIN F. FITCH.